(12) United States Patent
Hsu et al.

(10) Patent No.: US 11,438,914 B2
(45) Date of Patent: *Sep. 6, 2022

(54) SCHEDULING METHOD AND SCHEDULE LIST ESTABLISHING METHOD FOR USER EQUIPMENT END OF NARROWBAND INTERNET OF THINGS

(71) Applicant: Suzhou PanKore Integrated Circuit Technology Co. Ltd., Suzhou (CN)

(72) Inventors: Chao-Yuan Hsu, Hsinchu (TW); Jui-Peng Tsai, Hsinchu (TW); Tien-Ke Huang, Hsinchu (TW)

(73) Assignee: SUZHOU PANKORE INTEGRATED CIRCUIT TECHNOLOGY CO. LTD., Suzhou (CN)

( * ) Notice: Subject to any disclaimer, the term of this patent is extended or adjusted under 35 U.S.C. 154(b) by 102 days.

This patent is subject to a terminal disclaimer.

(21) Appl. No.: 17/065,549

(22) Filed: Oct. 8, 2020

(65) Prior Publication Data

US 2021/0112568 A1 Apr. 15, 2021

(30) Foreign Application Priority Data

Oct. 15, 2019 (TW) .................................. 108137129

(51) Int. Cl.
*H04W 72/12* (2009.01)
*H04W 72/04* (2009.01)

(52) U.S. Cl.
CPC ..... *H04W 72/121* (2013.01); *H04W 72/0446* (2013.01)

(58) Field of Classification Search
CPC ......................... H04W 72/121; H04W 72/0446
USPC ......................................................... 370/329
See application file for complete search history.

(56) References Cited

FOREIGN PATENT DOCUMENTS

WO WO 2018/063763 A1 4/2018

*Primary Examiner* — Gbemileke J Onamuti
(74) *Attorney, Agent, or Firm* — WPAT, PC

(57) ABSTRACT

A scheduling method and a method for establishing a schedule list for user equipment (UE) of NB-IoT are provided. The method for establishing the schedule list includes the following steps: synchronizing to a cell; receiving at least one system information parameter from the cell, the at least one system information parameter including at least one system information type and a narrowband system information block type; establishing multiple sub-lists according to the distributions of the at least one system information type and the narrowband system information block type, each element of the sub-lists representing an available subframe; assigning a sub-list code to each sub-list; calculating the number of elements for each sub-list; and establishing a list according to the at least one system information parameter, the sub-list codes, and the numbers of the elements.

20 Claims, 11 Drawing Sheets

```
struct
{
    uint8_t available;
    uint8_t n_sf[160];
} pattern[] = {
    {112, {1, 2, 3, 6, 7, 8, 11, 12, 13, 14, 16, 17, ...}},
    {120, {1, 2, 3, 4, 6, 7, 8, 11, 12, 13, 14, 16, 17, ...},
    {96,  {13, 14, 16, ..., 77, 78, 79, 93, 94, 96, ...},
    {104, {12, 13, 14, 16, ..., 77, 78, 79, 92, 93, 94, 96, ...},
    {104, {13, 14, 16, ..., 77, 78, 79, 81, 82, 83, 86, ...},
    {96,  {12, 13, 14, 16, ..., 77, 78, 79, 81, 82, 83, 84, 86, ...},
    {104, {13, 14, 16, ..., 77, 78, 79, 81, 82, 83, 86, ...},
    {96,  {12, 13, 14, 16, ..., 77, 78, 79, 81, 82, 83, 84, 86, ...},
};
```

FIG. 12

```
struct
{
    uint8_t pattern;
    uint16_t offset;
} available[256] = {
    {2, 0},
    {3, 96},
    {6, 200},
    {1, 304},
    {2, 416},
    {3, 512},
    {6, 616},
    {1, 720},
    ...
};
```

FIG. 13

- index:
  ```
  struct index_tuple {
      uint8_t i_p;
      uint8_t i_sf;
  };
  ```
- Function subfn2index() :
  ```
  struct index_tuple subfn2index(int n_sf);
  ```
- Function index2subfn():
  ```
  int index2subfn(struct index_tuple i)
  ```
- Function distance():
  ```
  int distance(struct index_tuple i1, struct index_tuple i2);
  ```
- Function add():
  ```
  struct index_tuple add(struct index_tuple index, int distance);
  ```

FIG. 14

SCHEDULING METHOD AND SCHEDULE LIST ESTABLISHING METHOD FOR USER EQUIPMENT END OF NARROWBAND INTERNET OF THINGS

BACKGROUND OF THE INVENTION

1. Field of the Invention

The present invention generally relates to the Narrowband Internet of Things (NB-IoT), and, more particularly, to the scheduling method and the method of establishing a schedule list for the user equipment (UE) of the NB-IoT.

2. Description of Related Art

FIG. 1 illustrates a schematic diagram of the conventional NB-IoT downlink scheduling. In FIG. 1, "SFN" is short for the system frame number, also known as the radio frame number; "SI window" (SI scheduling window) is used to indicate the type of the system information (SI) under scheduling (e.g., the three types of SI shown in FIG. 1: SI-1, SI-2 and SI-3). Each system frame includes 10 subframes, and the types of channels, information or signals that each subframe can carry include: Narrowband Primary Synchronization Signal (NPSS), Narrowband Secondary Synchronization Signal (NSSS), Narrowband Physical Broadcast Channel (NPBCH), Narrowband System Information Block Type1 (SIB1-NB, abbreviated as SIB1), system information type 1 (SI-1), system information type 2 (SI-2), system information type 3 (SI-3), and Narrowband Physical Downlink Control Channel (NPDCCH). The legends for these channels are shown at the top of FIG. 1. For example, subframe 0 (the subframe numbered 0 (zero), that is, subframe 0 of the 0th SFN) carries NPBCH (symbol "M"), subframe 44 (the subframe numbered 44, that is, the fourth subframe of the fourth SFN) carries SIB1 (symbol "B"), and subframe 121 (the subframe numbered 121, that is, the first subframe of the twelfth SFN) is not in use (blank).

Because NPSS, NSSS, NPBCH and SIB1 appear at fixed positions within certain periods in the above channels, information or signals, the type of the channel, information or signal of the subframe can be known from the numeral of the subframe. For example, NPSS appears in the 5th subframe of each SFN, NSSS appears in the 9th subframe of even SFNs, NPBCH appears in the 0th subframe of each SFN, and SIB1 appears in the fourth subframe in every other SFN (in this example, the period of SIB1 is 16 SFNs).

Because NPSS, NSSS, NPBCH, and SIB1 have higher priorities than SI-x (x being 1, 2, or 3) and NPDCCH, the subframes of NPSS, NSSS, NPBCH, and SIB1 are determined first, and then SI-x and NPDCCH use the remaining unused subframes according to their priorities (SI-x having a higher priority than NPDCCH). For example, SI-1 appears in the starting SI scheduling window with SFN=0, uses subframes {1, 2, 3, 6, 7, 8, 11, 12}, and repeats after eight radio frames. After all the SI-x have been arranged, the NPDCCH search spaces are arranged in the remaining subframes.

In the example of FIG. 1, a group of NPDCCH search spaces appears once every 64 subframes (i.e., the period T=64 subframes), and each appearance occupies 16 subframes (i.e., the maximum number of repetitions $R_{max}=16$ subframes). The maximum number of repetitions is a parameter set by the cell for NPDCCH, and the actual number of repetitions may vary in various NPDCCH transmissions. The actual number of repetitions is determined by the cell based on the channel conditions of the UE. Theoretically, the first NPDCCH repetitions starts from subframe 0, but it actually starts from subframe 13 and uses 16 subframes {13, 14, 16, 17, 18, 19, 21, 22, 23, 26, 27, 28, 31, 32, 33, 34} because NPSS, NSSS, NPBCH, SIB1 and S1-1 have higher priorities than NPDCCH. Similarly, the second NPDCCH repetitions theoretically starts from subframe 64 (because of the period T=64 subframes), but it actually starts from subframe 66 and uses 16 subframes {66, 67, 68, 71, 72, 73, 74, 76, 77, 78, 79, 93, 94, 96, 97, 98}.

In the example of FIG. 1, the offset of NPDCCH is 0 (zero) subframes. If the offset were 3 subframes, the second NPDCCH repetitions would start from subframe 67, whereas the first NPDCCH repetitions would still start from subframe 13 because subframes 3 to 12 are already in use.

The NB-IoT UE needs to know the following pieces of information when scheduling:

1. to know whether a certain target subframe is an NPDCCH candidate subframe, and if it is, to further know which subframe in an NPDCCH repetitions is the target subframe (i.e., to know the ordinal position of the target subframe in the NPDCCH repetitions). Taking the scheduling of FIG. 1 as an example, the target subframe numbered 14 is the second subframe of the first NPDCCH repetitions, and the target subframe numbered 71 is the fourth subframe of the second NPDCCH repetitions.
2. to know the start subframe of the NPDCCH repetitions closest to the target subframe. Taking the scheduling of FIG. 1 as an example, the start subframe of the first NPDCCH repetitions is subframe 13 and the start subframe of the second NPDCCH repetitions is subframe 66.
3. to know the end subframe of the NPDCCH repetitions closest to the target subframe. Taking the scheduling of FIG. 1 as an example, the end subframe of the first NPDCCH repetitions is subframe 34 and the end subframe of the second NPDCCH repetitions is subframe 98.

In order to obtain the pieces of information mentioned above, the UE needs to check, from the start of an NPDCCH repetitions (i.e., the subframe numbered T*L+O, where T is the period, O is the offset and L=0, 1, 2, 3 . . . ), one by one whether a subframe is not in use and can be used for downlink transmission (which is described in the "downlinkBitmap-r13" information of SIB1). Once a subframe is confirmed to be free (not in use) and usable for downlink transmission, that subframe can be arranged to receive the NPDCCH. The above method is referred to as the "iteration over subframes" algorithm in this specification.

The UE needs to obtain the pieces of information mentioned above within one subframe (which is about 1 ms), meanwhile, the UE has to complete other tasks in the same subframe which include the scheduling and control in the physical layer (PHY). In other words, the UE has to perform a large number of calculations within a limited time, and the number of iterations performed in the above-mentioned "iteration over subframes" algorithm increases with the maximum number of repetitions $R_{max}$, which may be as high as 2048.

Therefore, the UE, especially the low-cost and low-power-consumption UE, needs a more efficient scheduling method to deal with the above-mentioned limitations or requirements that may impose heavy loads on the UE.

SUMMARY OF THE INVENTION

In view of the issues of the prior art, an object of the present invention is to provide a scheduling method and a method of establishing a schedule list for the NB-IoT UE, so as to make an improvement to the prior art.

A method of establishing a schedule list for user equipment (UE) of Narrowband Internet of Things (NB-IoT) is provided. The method includes the following steps: synchronizing with a cell; receiving at least one system information parameter from the cell, wherein the at least one system information parameter includes at least one system information type and a Narrowband system information block type; establishing a plurality of sub-lists based on distributions of the at least one system information type and the Narrowband system information block type, wherein each element in the sub-lists represents an available subframe; assigning a sub-list code to each sub-list; calculating a total number of elements for each sub-list; and establishing a list based on the at least one system information parameter, the sub-list codes and the total numbers of elements.

A scheduling method for user equipment (UE) of Narrowband Internet of Things (NB-IoT) is provided. The method includes the following steps: synchronizing with a cell; receiving at least one system information parameter from the cell, wherein the at least one system information parameter includes a maximum number of repetitions, a period and an offset of Narrowband Physical Downlink Control Channel (NPDCCH) search spaces; establishing a list based on the at least one system information parameter, wherein a plurality of available subframes is directly or indirectly listed in the list, and each available subframe is labeled with an index; calculating a numeral of a start subframe of a target NPDCCH repetitions based on a numeral of a target subframe, the period and the offset; using the numeral of the start subframe to search the list for a start index corresponding to the start subframe; searching the list for a target index corresponding to the target subframe; determining whether the target subframe is within an interval of the target NPDCCH repetitions based on a determination as to whether a difference between the start index and the target index is smaller than the maximum number of repetitions; and determining whether the target subframe is an NPDCCH candidate subframe based on the target index and the numeral of the target subframe. The step of establishing the list based on the at least one system information parameter includes the following steps: establishing a plurality of sub-lists based on distributions of at least one system information type and a Narrowband system information block type, wherein each element in the sub-lists represents one of the available subframes; assigning a sub-list code to each sub-list; calculating a total number of elements for each sub-list; and establishing the list based on the at least one system information parameter, the sub-list codes and the total numbers of elements.

A scheduling method for user equipment (UE) of Narrowband Internet of Things (NB-IoT) is provided. The method includes the following steps: synchronizing with a cell; receiving at least one system information parameter from the cell, wherein the at least one system information parameter includes a maximum number of repetitions, a period and an offset of Narrowband Physical Downlink Control Channel (NPDCCH) search spaces; establishing a list based on the at least one system information parameter, wherein a plurality of available subframes is directly or indirectly listed in the list, and each available subframe is labeled with an index; calculating a numeral of a first start subframe of a target NPDCCH repetitions based on a numeral of a target subframe, the period and the offset; using the numeral of the first start subframe to search the list for a start index corresponding to the first start subframe; searching the list for a target index corresponding to the target subframe; determining whether the target subframe is within an interval of the target NPDCCH repetitions based on a determination as to whether a difference between the start index and the target index is smaller than the maximum number of repetitions; and searching for the first start subframe of the target NPDCCH repetitions, or searching for a second start subframe of a next NPDCCH repetitions. The next NPDCCH repetitions immediately follows the target NPDCCH repetitions. The step of establishing the list based on the at least one system information parameter includes the following steps: establishing a plurality of sub-lists based on distributions of at least one system information type and a Narrowband system information block type, wherein each element in the sub-lists represents one of the available subframes; assigning a sub-list code to each sub-list; calculating a total number of elements for each sub-list; and establishing the list based on the at least one system information parameter, the sub-list codes and the total numbers of elements.

According to the present invention, the scheduling method for the NB-IoT UE improves the scheduling efficiency of the UE by establishing lists and searching the lists. In comparison with the conventional technology, because the scheduling method of the present invention does not need to check the subframes one by one in the time domain, the performance of the UE is improved so that the UE can complete all necessary calculations in a subframe. In addition, a method of establishing schedule lists is also provided in this invention to further reduce the memory usage of the lists. Therefore, the UE designed based on the present invention is more competitive.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 12 illustrates the implementation of the lists in table 3 using a structure in C language.

FIG. 13 illustrates the implementation of the lists in table 4 using a structure in C language.

FIG. 14 illustrates the index i and the examples of the four functions in C language.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

Some or all of the processes of the scheduling method and the method of establishing a schedule list may be implemented by software and/or firmware and can be performed by the NB-IoT UE and its equivalents. A person having ordinary skill in the art can choose components or steps equivalent to those described in this specification to carry out the present invention, which means that the scope of this invention is not limited to the embodiments in the specification.

Figure 2:
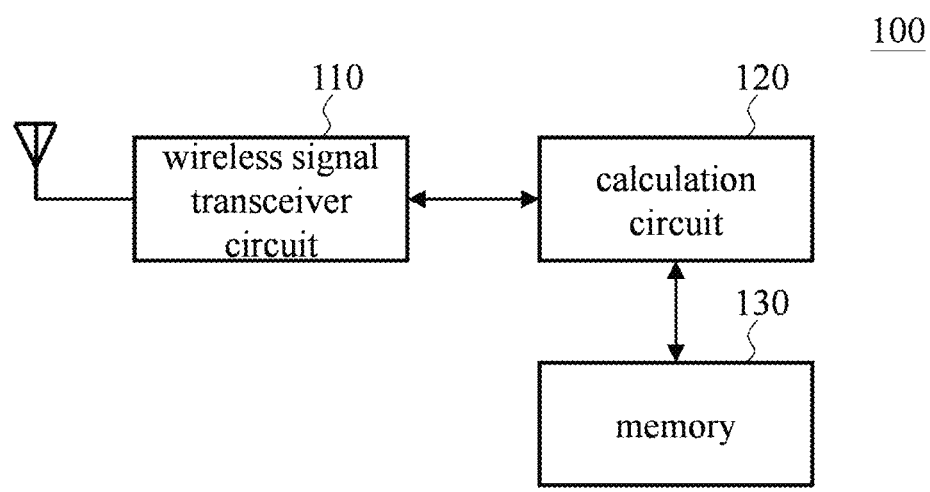
FIG. 2 illustrates a functional block diagram of NB-IoT UE according to an embodiment of the present invention.
Figure 3:
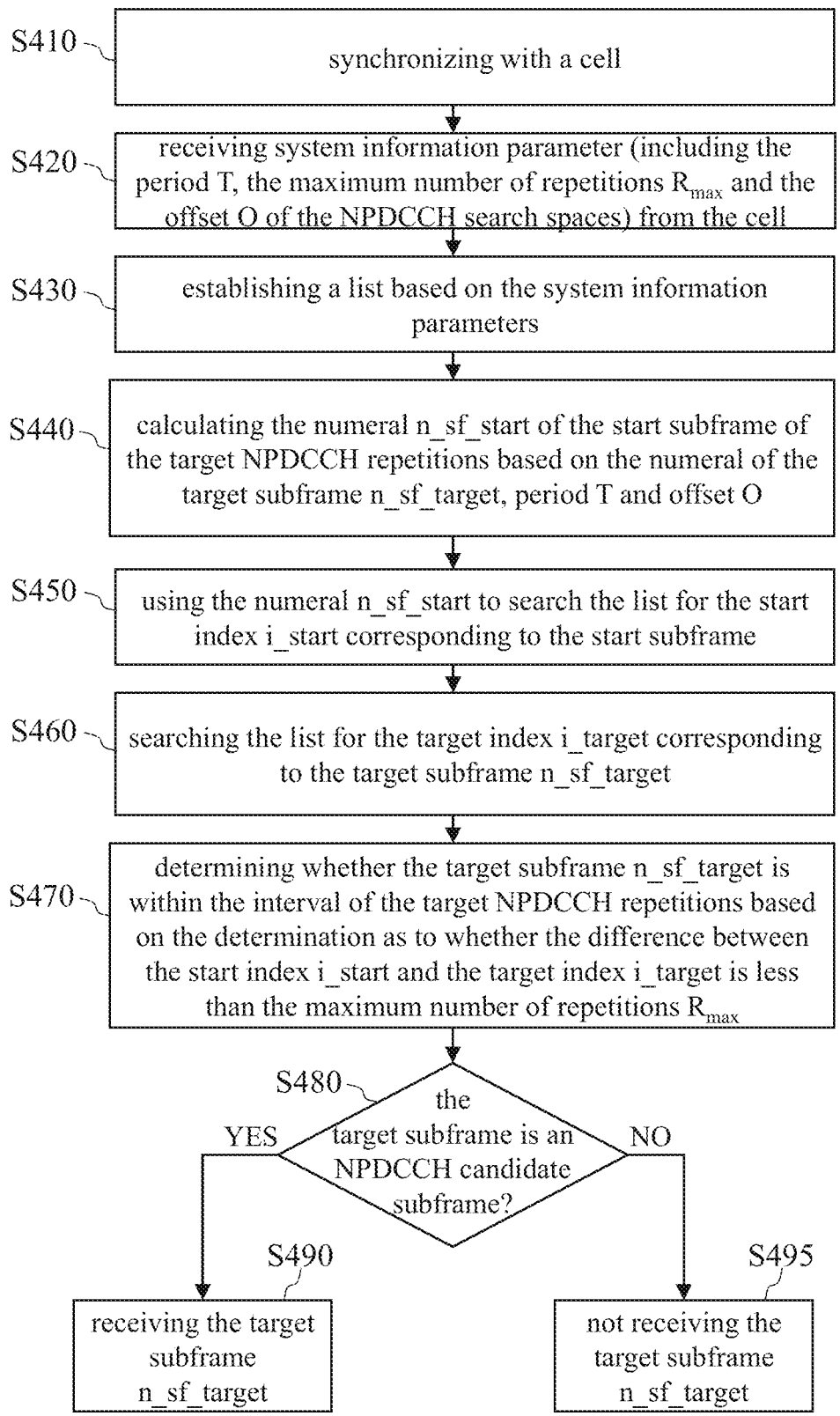
FIG. 3 illustrates a flowchart of the scheduling method for the UE according to an embodiment of the present invention.

FIG. 2 is a functional block diagram of NB-IoT UE according to an embodiment of the present invention. The UE 100 includes a wireless signal transceiver circuit 110, a calculation circuit 120 and a memory 130. The calculation circuit 120 may be a circuit or an electronic component with program execution capability, such as a central processing unit (CPU), a microprocessor, or a micro-processing unit. The calculation circuit 120 realizes the functions of the UE 100 by executing the program codes or program instructions stored in the memory 130. FIG. 3 is a flowchart of the scheduling method for the UE according to an embodiment of the present invention. The calculation circuit 120 performs the flow of FIG. 3 to know whether a target subframe n_sf_target is an NPDCCH candidate subframe. Reference is made to FIG. 2 and FIG. 3 for the following discussions.

Step S410: The UE 100 is synchronized with a cell (not shown). The calculation circuit 120 receives the signals from the cell using the wireless signal transceiver circuit 110 and synchronizes with the cell based at least on NPSS and NSSS. The details of the synchronization between the UE 100 and the cell are well known to people having ordinary skill in the art and thus omitted for brevity.

Step S420: The calculation circuit 120 receives at least one system information parameter from the cell through the wireless signal transceiver circuit 110. The system information parameters are, for example, NPSS, NSSS, NPBCH, SIB1, and SI-x, and the system information parameters include the period T, the maximum number of repetitions $R_{max}$ and the offset O of the NPDCCH search spaces. People having ordinary skill in the art can obtain, from the system information parameters, the period T, the maximum number of repetitions $R_{max}$ and the offset O of the NPDCCH search spaces according to the NB-IoT specifications, and the details are omitted for brevity.

Step S430: The calculation circuit 120 establishes a list based on the system information parameters, and multiple subframes are listed in the list. More specifically, the calculation circuit 120 can learn the subframes (and the numerals thereof) occupied by NPSS, NSSS, NPBCH, SIB1 and SI-x based on the system information parameters. In other words, the calculation circuit 120 can learn the subframes that can be used for downlink transmission and are not in use (which are referred to as available subframes) and their numerals. For example, table 1 is an example of the list corresponding to the scheduling in FIG. 1.

TABLE 1

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| subframe | 13 | 14 | 16 | 17 | 18 | 19 | 21 | 22 | 23 | 26 | 27 | 28 | 31 | 32 | 33 | 34 |
| index | 16 | 17 | 18 | 19 | 20 | 21 | 22 | 23 | 24 | 25 | 26 | 27 | 28 | 29 | 30 | 31 |
| subframe | 36 | 37 | 38 | 39 | 41 | 42 | 43 | 46 | 47 | 48 | 51 | 52 | 53 | 54 | 56 | 57 |
| index | 32 | 33 | 34 | 35 | 36 | 37 | 38 | 39 | 40 | 41 | 42 | 43 | 44 | 45 | 46 | ... |
| subframe | 58 | 59 | 61 | 62 | 63 | 66 | 67 | 68 | 71 | 72 | 73 | 74 | 76 | 77 | 78 | ... |

Each available subframe listed in the list may be used to carry NPDCCH and corresponds to an index. In some embodiments, monotonic increase or decrease can be seen in both the numerals of the available subframes and the indices, but the implementation is not limited to monotonic increase or decrease. In some embodiments, the list may be stored in the memory 130 in the form of an array, in which case the numerals of the available subframes are the elements of the array whereas and the indices are the indices of the array.

Some functions are defined herein for the purpose of clearer description of this invention. These functions can be implemented as segments of the program codes or program instructions stored in the memory 130.

1. The function subfn2index(n_sf) which is used for finding the index of the available subframe that is closet to and not smaller than the subframe n_sf. For example, subfn2index(13)=0, subfn2index(15)=2, and subfn2index(20)=6.
2. The function index2subfn(i) which is used for finding the available subframe of index i. For example, index2subfn(2)=16 and index2subfn(25)=48.
3. The function distance(i1, i2) which is used for finding the difference (i1−i2) between index i1 and index i2. This difference represents the total number of available subframes between index i1 and index i2. For example, distance(0, 1)=1−0=1 and distance(32, 37)=37−32=5.
4. The function add(i, d) which is used for finding the index that is d available subframes away from index i (namely, d−1 available subframes between the two indices). For example, add(1, 2)=1+2=3.

Step S440: Calculating the numeral n_sf_start of the start subframe of the target NPDCCH repetitions based on the numeral of the target subframe n_sf_target, period T and offset O. In this step, the calculation circuit 120 may calculate the numeral n_sf_start based on equation (1).

$$n\_sf\_start = \lfloor n\_sf \div T \rfloor \times T + O \qquad (1)$$

Figure 1:
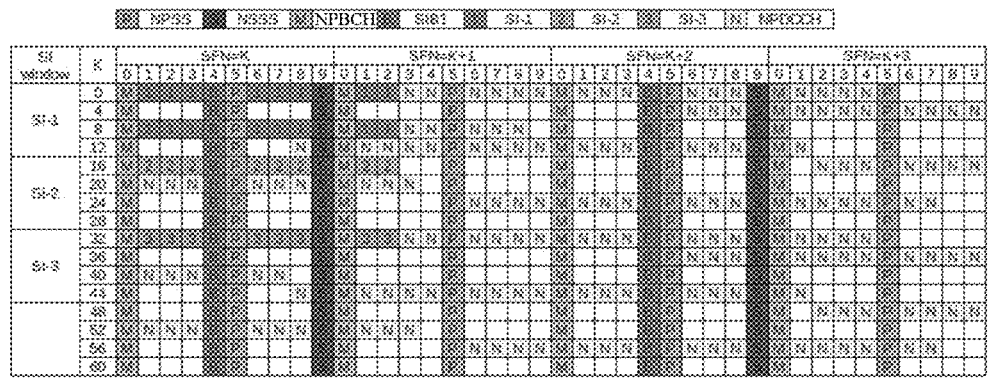
FIG. 1 illustrates a schematic diagram of the conventional NB-IoT downlink scheduling.

For example, when the numeral of the target subframe n_sf_target is 77, the maximum number of repetitions $R_{max}$=16, the period T=64 and the offset O=0, the numeral n_sf_start=[77÷64]×64+0=1*64=64. As illustrated by the scheduling of FIG. 1, the target NPDCCH repetitions is the second NPDCCH repetitions, and because the subframe corresponding to the numeral n_sf_start=64 is occupied by SIB1, the subframe 64 is not the actual start subframe (subframe 66 is the actual start subframe).

Figure 4:
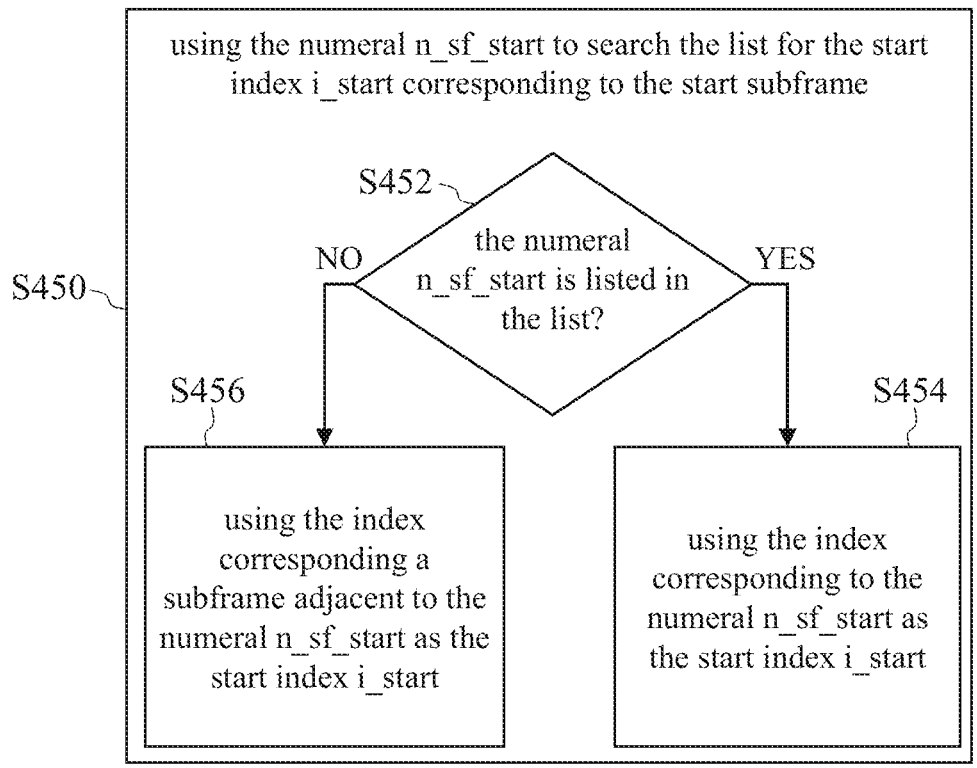
FIG. 4 illustrates a detailed flow of step S450 of FIG. 3.

Step S450: The calculation circuit 120 uses the numeral n_sf_start to search the list for the start index i_start corresponding to the start subframe. Reference is made to FIG. 4, which is a detailed flow of step S450. In step S452, the calculation circuit 120 determines whether the numeral n_sf_start is listed in the list. If so, the calculation circuit 120 executes step S454. If not, the calculation circuit 120 executes step S456. In step S454, the calculation circuit 120 uses the index corresponding to the numeral n_sf_start as the start index i_start. More specifically, i_start is obtained in step S454 by calculating subfn2index(n_sf_start). For example, i_start=subfn2index(66)=37. In step S456, the calculation circuit 120 uses the index corresponding to an adjacent subframe whose numeral is closest to and not smaller than the numeral n_sf_start as the start index i_start. For example, the adjacent subframe whose numeral is closest to and not smaller than the numeral n_sf_start=64 is subframe 66, and the index of subframe 66 is i_start=37. In other words, i_start can be obtained in step S456 by calculating subfn2index(n_sf_start) as well, namely, i_start=subfn2index(64)=37. In step S450, the calculation circuit 120 may employ the binary search algorithm to find the start index i_start.

Step S460: The calculation circuit 120 searches the list for the target index i_target corresponding to the target subframe n_sf_target. Similar to the previous step, in cases where both the indices and the subframe numerals are monotonically increasing, the calculation circuit 120 searches the list for the index that is closest to and not smaller than the target subframe n_sf_target. When n_sf_target=77, i_target=subfn2index(77)=45.

Step S470: The calculation circuit 120 determines whether the target subframe n_sf_target is within the interval of the target NPDCCH repetitions based on the determination as to whether the difference between the start index i_start and the target index i_target is smaller than the maximum number of repetitions $R_{max}$. The interval of one NPDCCH repetitions refers to all the subframes between the start subframe and the end subframe of that NPDCCH repetitions. For example, in the example of FIG. 1, the interval of the first NPDCCH repetitions ranges from subframe 13 to subframe 34, and the interval of the second NPDCCH repetitions ranges from subframe 66 to subframe 98.

Figure 5:
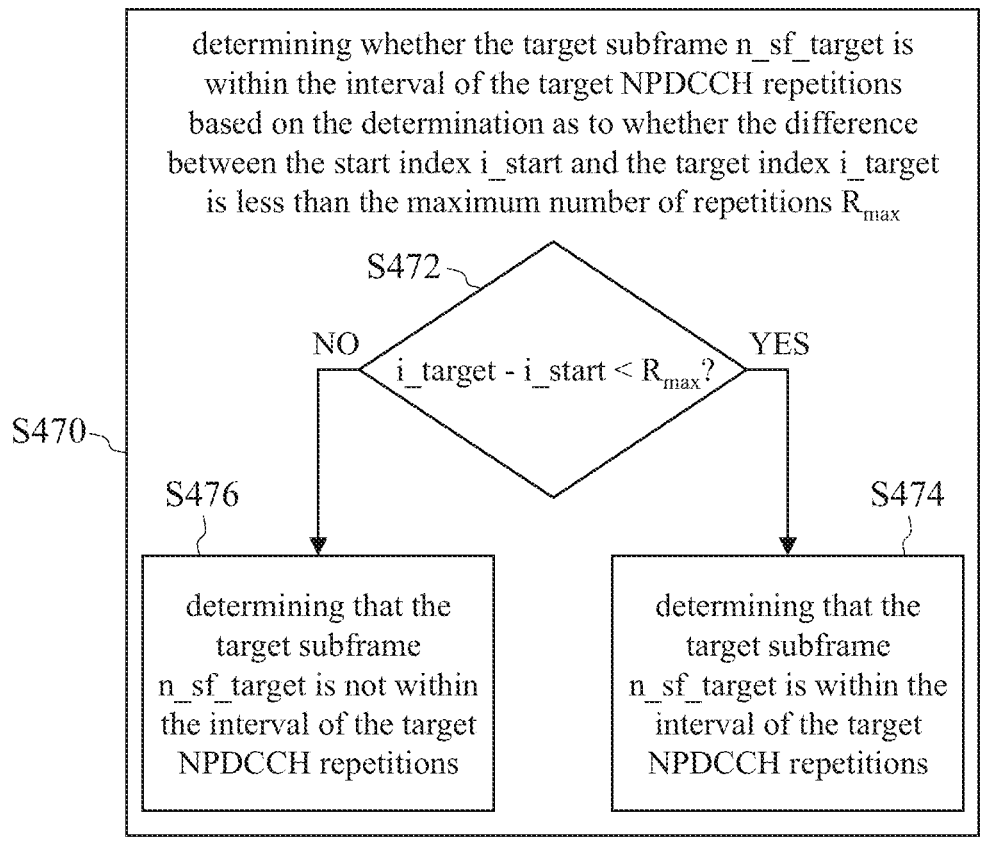
FIG. 5 illustrates a detailed flow of step S470 of FIG. 3.

Reference is made to FIG. 5, which is a detailed flow of step S470. In step S472, the calculation circuit 120 determines whether (i_target−i_start) is smaller than the maximum number of repetitions $R_{max}$, namely, whether the result of function distance(i_target, i_start) is smaller than $R_{max}$ (step S472). If so, the calculation circuit 120 determines that the target subframe n_sf_target is within the interval of the target NPDCCH repetitions (step S474). If not, the calculation circuit 120 determines that the target subframe n_sf_target is not within the interval of the target NPDCCH repetitions (step S476). Continuing with the above example, because distance(i_target, i_start)=45−37=8<$R_{max}$=16, the calculation circuit 120 can know for sure that the target subframe n_sf_target is within the second NPDCCH repetitions (as shown in FIG. 1, 66<n_sf_target=77<98).

Step S480: The calculation circuit 120 determines whether the target subframe n_sf_target is an NPDCCH candidate subframe based on the target index i_target and the numeral of the target subframe n_sf_target. The calculation circuit 120 first uses the target index i_target to search the list for the corresponding subframe n_sf_temp (i.e., n_sf_temp=index2subfn(i_target)), and then determines whether the numeral of the target subframe n_sf_target is the same as the numeral of the subframe n_sf_temp. If so (i.e., n_sf_target=n_sf_temp), the target subframe n_sf_target is an NPDCCH candidate subframe. If not (i.e., n_sf_target≠n_sf_temp), the target subframe n_sf_target is not an NPDCCH candidate subframe. For example, although the target subframes n_sf_target numbered 75 and 76 both correspond to the target index i_target=44 (i.e., subfn2index(75)=subfn2index(76)=44), the numeral of the subframe n_sf_temp corresponding to the target index i_target=44 is 76 (i.e., index2subfn(44)=76). Therefore, the calculation circuit 120 can learn that the target subframe n_sf_target numbered 75 is not an NPDCCH candidate subframe and that the target subframe n_sf_target numbered 76 is an NPDCCH candidate subframe.

After finishing the step S480 in FIG. 3, the calculation circuit 120 can know whether the target subframe n_sf_target is an NPDCCH candidate subframe. In step S490, when it is determined that the target subframe n_sf_target is an NPDCCH candidate subframe, the UE 100 receives the target subframe n_sf_target. In step S495, when it is determined that the target subframe n_sf_target is not an NPDCCH candidate subframe, the UE 100 does not receive the target subframe n_sf_target.

Figure 6:
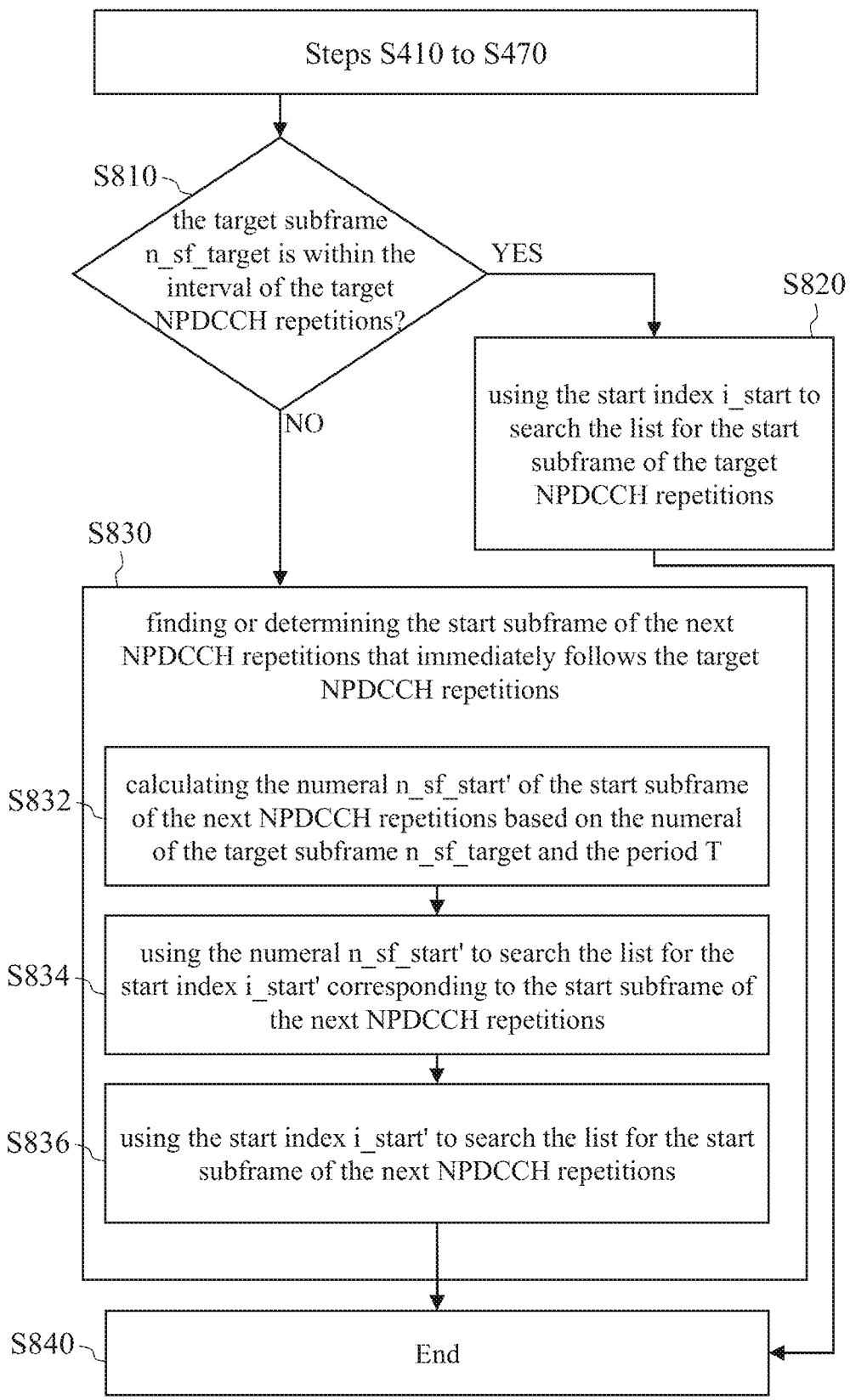
FIG. 6 illustrates a flowchart of the scheduling method for the UE according to another embodiment of the present invention.

FIG. 6 is a flowchart of the scheduling method for the UE according to another embodiment of the present invention. The calculation circuit 120 performs the flow of FIG. 6 to know the start subframe of the NPDCCH repetitions closest to the target subframe n_sf_target.

Step S810: The calculation circuit 120 determines whether the target subframe n_sf_target is within the interval of the target NPDCCH repetitions. If so, the calculation circuit 120 executes step S820. If not, the calculation circuit 120 executes step S830. The calculation circuit 120 ends the flow of FIG. 6 (step S840) after finishing step S820 or step S830.

Step S820: The calculation circuit 120 uses the start index i_start to search the list for the start subframe of the target NPDCCH repetitions. For instance, continuing with the above example, because the target subframe n_sf_target numbered 77 is within an NPDCCH repetitions (learned in step S470), in step S820 the calculation circuit 120 directly uses the start index i_start (=37) obtained in step S450 to conduct the search in the list for the subframe corresponding to the start index i_start (which subframe turns out to be 66, namely, index2subfn(37)=66). The subframe corresponding to the start index i_start is the start subframe of the target NPDCCH repetitions.

Step S830: The calculation circuit 120 finds or determines the start subframe of the next NPDCCH repetitions that immediately follows the target NPDCCH repetitions. Step S830 includes sub-steps S832, S834 and S836.

Step S832: The calculation circuit 120 calculates the numeral n_sf_start' of the start subframe of the next NPDCCH repetitions based on the numeral of the target subframe n_sf_target and the period T. In this step, the calculation circuit 120 may calculate the numeral n_sf_start' based on equation (2).

$$n\_sf\_start' = \lfloor n\_sf \div T \rfloor \times T + O \qquad (2)$$

For example, when the numeral of the target subframe n_sf_target is 44, the maximum number of repetitions $R_{max}$=16, the period T=64 and the offset O=0, the numeral n_sf_start'=⌊44÷64⌋×64+0=1*64=64. As shown in the scheduling of FIG. 1, the NPDCCH repetitions next to the target NPDCCH repetitions is the second NPDCCH repetitions, and the second NPDCCH repetitions immediately follows the first NPDCCH repetitions (i.e., no other NPDCCH repetitions is present between the first and second NPDCCH repetitions).

Step S834: The calculation circuit 120 uses the numeral n_sf_start' to search the list for the start index i_start' corresponding to the start subframe of the next NPDCCH repetitions. Continuing with the above example, the calculation circuit 120 uses the numeral n_sf_start'=64 to search the list, and the start index i_start'=37 is thus obtained (i.e., subfn2index(64)=37).

Step S836: The calculation circuit 120 uses the start index i_start' to search the list for the start subframe of the next NPDCCH repetitions. Continuing with the above example, the calculation circuit 120 uses the start index i_start'=37 to search the list, and the numeral of the start subframe (which is 66) is thus obtained (i.e., index2subfn(37)=66).

In summary, by establishing a list and searching the list, the UE can save the efforts to check the subframes one by one and consequently operate at a higher speed. Unfortunately, because SI-x has a maximum of 40960 subframes, the array in the memory 130 that represents the list may have as many as 40960 elements. In cases where each element is represented by a 16-bit integer, the array that represents the list takes up (16/8)*40960=81920 bytes. Such memory usage is nearly impracticable to the low-cost and low-power-consumption UE. Therefore, the present invention also provides a method of establishing a schedule list aiming at decreasing the memory usage (i.e., reducing the size of the list), which is described in detail below.

Figure 7:
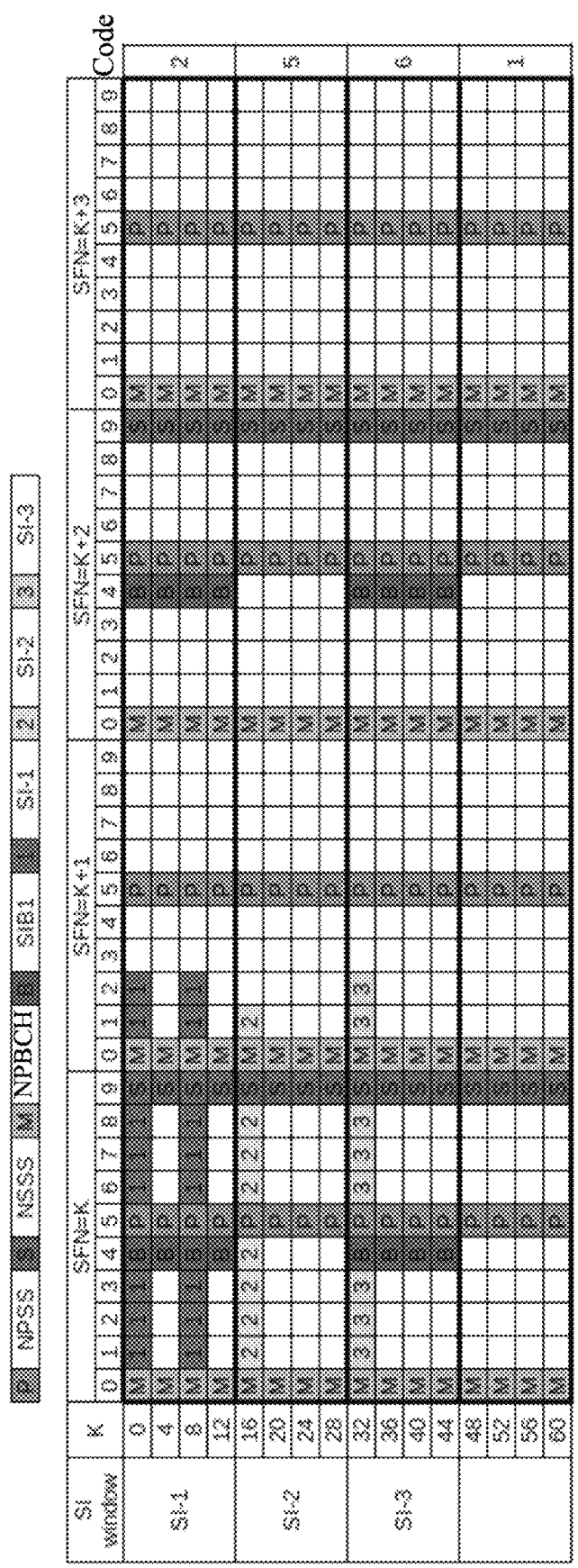
FIG. 7 illustrates another schematic diagram of the conventional NB-IoT downlink scheduling.
Figure 8:
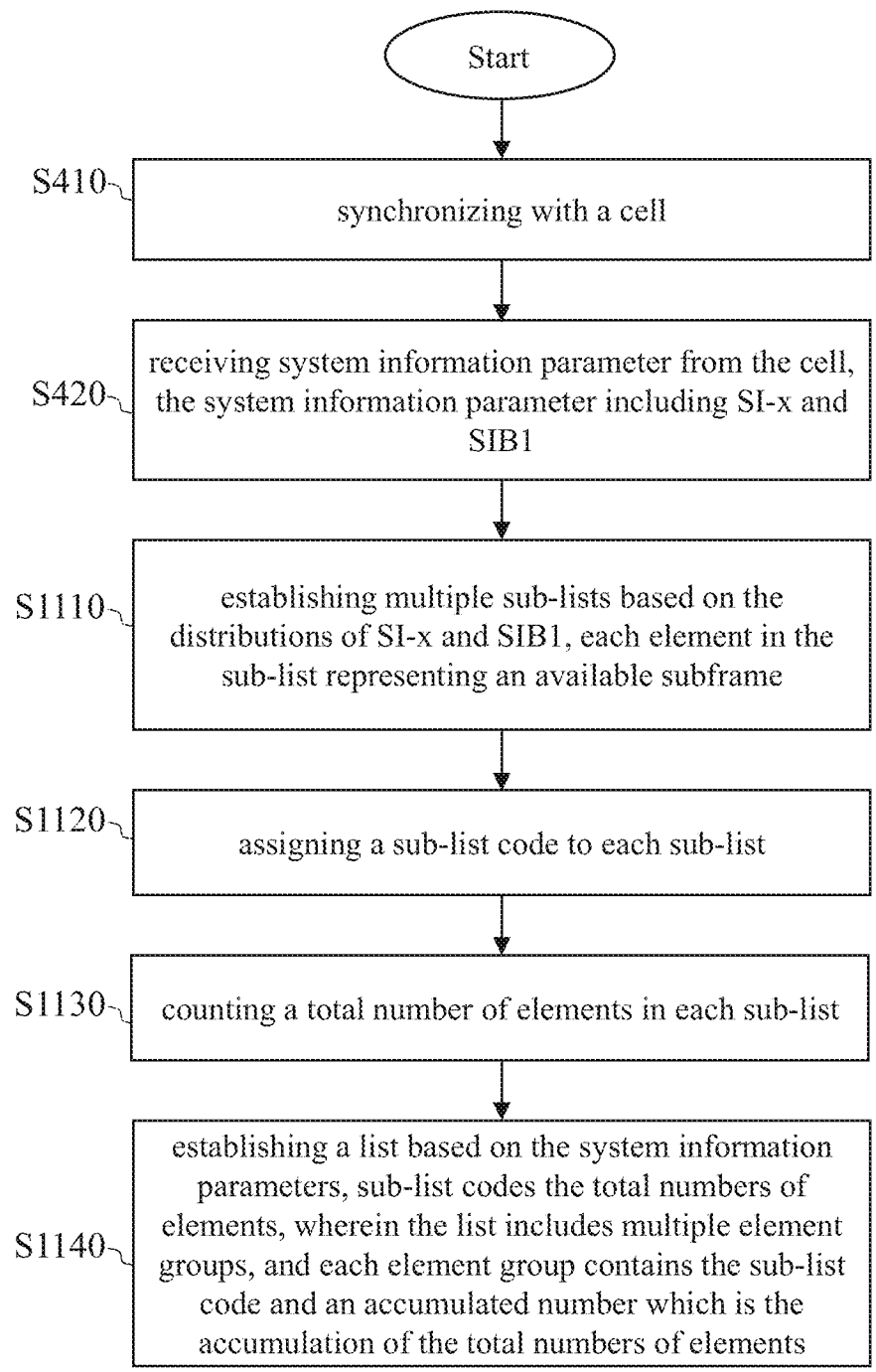
FIG. 8 illustrates a flowchart of a method of establishing a schedule list according to the present invention.

FIG. 7 illustrates another schematic diagram of the conventional NB-IoT downlink scheduling. Since rules for the appearances of NPSS, NSSS, NPBCH, SIB1 and SI-x (x being 1, 2 or 3) are specified in the specification of NB-IoT, the schedule list can be simplified according to the specification of NB-IoT to reduce the memory usage. FIG. 8 illustrates a flowchart of a method of establishing a schedule list according to the present invention. First, the calculation circuit 120 synchronizes with the cell (step S410) and then receives at least one system information parameter from the cell. For example, the system information parameter can be NPSS, NSSS, NPBCH, SIB1, and SI-x (step S420). The details of steps S410 and S420 can be found in the discussions above and are thus omitted for brevity.

Step S1110: Establishing multiple sub-lists based on the distributions of SI-x and SIB1. In the absence of SI offset the number of types of the sub-list is 2*(the number of SI-x plus 1) when 160 subframes are treated as a sub-list. In this example, the number of SI-x is 3, so there are 8 types of sub-lists. These 8 types of sub-lists, which are shown in table 2 below, are derived based on the distributions of SIB1 and SI-x.

TABLE 2

| SI-x/SIB1 | SIB1 | no SIB1 |
|---|---|---|
| no SI-x | 0 | 1 |
| only SI-1 | 2 | 3 |
| only SI-2 | 4 | 5 |
| only SI-3 | 6 | 7 |

Step S1120: Assigning a sub-list code to each sub-list. The codes 0 to 7 in table 2 are the sub-list codes. For example, sub-list 1 describes that neither SIB1 nor SI-x is present in the 160 subframes, such as the subframes 480 to 639 in FIG. 7; sub-list 6 describes that both SIB1 and SI-3 are present in the 160 subframes, such as the subframes 320 to 479 in FIG. 7. Table 3 below shows part of the content of each sub-list. Each element in the sub-list corresponds to a sub-list index and represents an available subframe. Please note that the numbering of the subframes in each sub-list starts from 0 (zero). For example, the first available subframe in sub-list 6 is subframe 13 (because subframes 0 to 12 are used by NPBCH, SIB1, NPSS, NSSS and SI-3), and the first available subframe in sub-list 1 is subframe 1 (because subframe 0 is used by NPBCH).

TABLE 3

| sub-list code | sub-list | total number of elements |
|---|---|---|
| 0 | {1, 2, 3, 6, 7, 8, 11, 12, 13, 14, 16, 17, . . .} | 112 |
| 1 | {1, 2, 3, 4, 6, 7, 8, 11, 12, 13, 14, 16, 17, . . .} | 120 |
| 2 | {13, 14, 16, . . . , 77, 78, 79, 93, 94, 96, . . .} | 96 |
| 3 | {12, 13, 14, 16, . . . , 77, 78, 79, 92, 93, 94, 96, . . .} | 104 |
| 4 | {13, 14, 16, . . . , 77, 78, 79, 81, 82, 83, 86, . . .} | 104 |
| 5 | {12, 13, 14, 16, . . . , 77, 78, 79, 81, 82, 83, 84, 86, . . .} | 96 |
| 6 | {13, 14, 16, . . . , 77, 78, 79, 81, 82, 83, 86, . . .} | 104 |
| 7 | {12, 13, 14, 16, . . . , 77, 78, 79, 81, 82, 83, 84, 86, . . .} | 96 |

Step S1130: Counting a total number of elements in each sub-list. The total number of elements in table 3 represents the total number of available subframes in each sub-list. For example, sub-list 2 has elements 13, 14, 16, . . . , which respectively correspond to sub-list indices 0, 1, 2, . . . , and there are a total of 96 elements in sub-list 2. In other words, there are 96 available subframes in the 160 subframes corresponding to sub-list 2.

Step S1140: Establishing a list based on the system information parameters, sub-list codes and the total numbers of elements. Table 4 is an example of the list.

TABLE 4

| list index | element group ({sub-list code, total numbers of elements}) |
|---|---|
| 0 | {2, 0} |
| 1 | {5, 96} |
| 2 | {6, 192} |
| 3 | {1, 296} |
| 4 | {2, 416} |
| 5 | {5, 512} |
| 6 | {6, 608} |
| 7 | {1, 712} |
| . . . | . . . |

The list includes multiple element groups, and each element group contains the sub-list code and the accumulated number. For example, the sub-list code and the accumulated number for element group 0 are 2 and 0, respectively; the sub-list code and the accumulated number for element group 3 are 1 and 296, respectively. The list of table 4 shows that subframes 0 to 159 (corresponding to list index 0) can be represented by sub-list 2, subframes 160 to 319 (corresponding to list index 1) can be represented by sub-list 3, subframe 320 to 479 (corresponding to list index 2) can be represented by sub-list 6, and so on. Since SI-x has a maximum of 40960 subframes, the list has at most 40960/160=256 element groups (corresponding to list indices 0 to 255).

The accumulated number is the accumulation of the total numbers of elements in the sub-list. For example (reference is made to tables 3 and 4), because the list index 0 corresponds to the first sub-list (which is sub-list 2 in table 4), the accumulation of the total numbers of elements in the sub-list is 0; because the list index 1 corresponds to the second sub-list (which is sub-list 5 in table 4), the accumulated number is the sum of the preceding accumulated number (which is 0 in table 4) and the total number of elements in the preceding sub-list (which is sub-list 2 in table 4), namely, the sum (i.e., the accumulated number) is 0+96=96, 96 being the total number of elements of sub-list 2 in table 3; because the list index 2 corresponds to the third sub-list (which is sub-list 6 in table 4), the accumulated number is the sum of the preceding accumulated number (which is 96 in table 4) and the total number of elements in the preceding sub-list (which is sub-list 5 in table 4), namely, the sum (i.e., the accumulated number) is 96+96=192, 96 being the total number of elements of sub-list 5 in table 3; and so on.

Please note that the contents of tables 2 to 4 are dependent upon the system information parameters. People having ordinary skill in the art can generate corresponding tables 2 to 4 based on different system information parameters according to the above discussions. It is observed by comparing the list of table 1 and the list of table 4 that the subframes are directly listed in the list of table 1, whereas the subframes are indirectly listed in the list of table 4 (because the subframes are listed in the sub-lists). Thus, the list of table 1 can be regarded as a one-tier list (the contents of the list being subframes), whereas the list of table 4 can be regarded as a two-tier list (the contents of the list including sub-list codes, and the contents of the sub-list, as illustrated by table 3, including subframes). In response to the one-tier list being converted to the two-tier list, the operation details of the functions 1 to 3 among the four functions discussed above can be illustrated by the flows of FIGS. 9 to 11.

Figure 9:
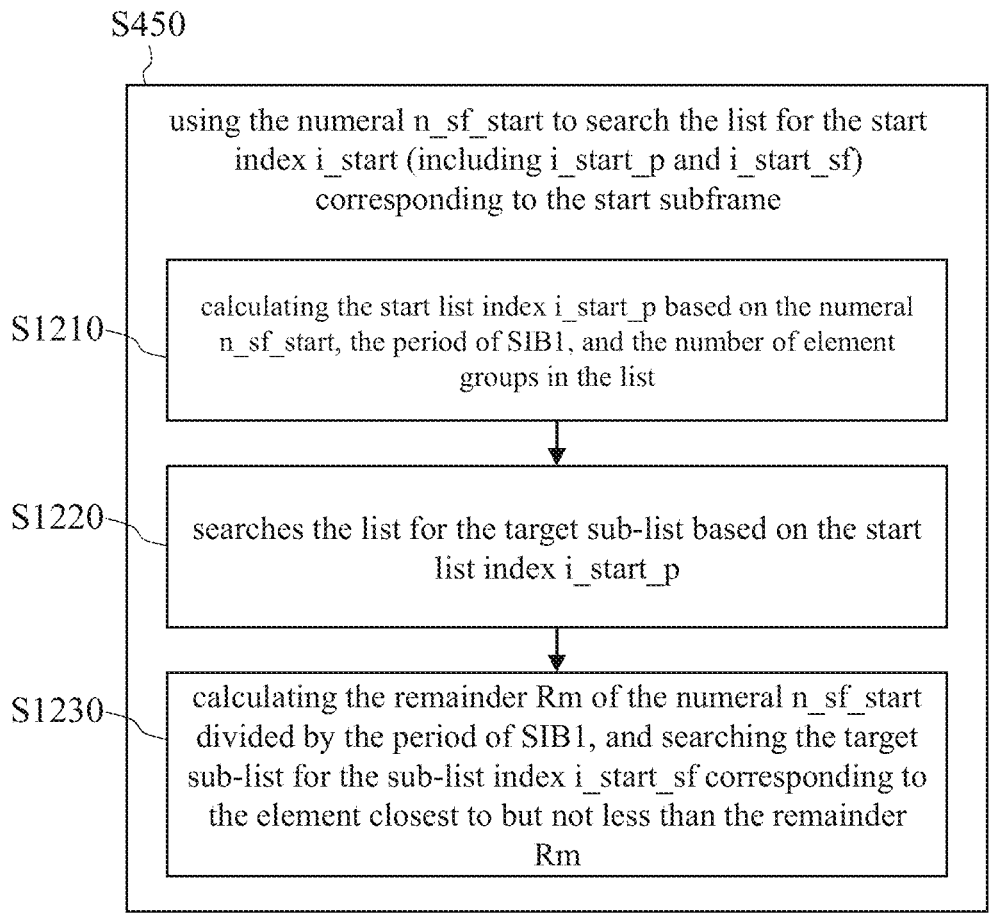
FIG. 9 illustrates the details of step S450 of FIG. 3 based on the two-tier list.

FIG. 9, which includes steps S1210 to S1230, shows the operation details (including the operation details of the function subfn2index0) of the step S450 based on the two-tier list. Please note that in response to the two-tier list, the index i is modified to include the list index i_p and the sub-list index i_sf. For example, the start index i_start includes a start list index i_start_p and a start sub-list index i_start_sf.

Step S1210: The calculation circuit 120 calculates the start list index i_start_p based on the numeral n_sf_start, the period of SIB1 (160 ms), and the number of the element groups in the list (256). i_start_p=⌊n_sf_start÷160⌋ mod 256. "mod" is short for modulo operation. "mod 256" means the scheduling period is 256 units, because a scheduling period has 40960 subframes in which every 160 subframes are treated as a unit. For example, when n_sf_start=66, i_start_p=0 mod 256=0; and when n_sf_start=166, i_start_p=1 mod 256=1.

Step S1220: The calculation circuit 120 searches the list for the target sub-list based on the start list index i_start_p. Taking the list of table 4 as an example, the start list index i_start_p=0 corresponds to the target sub-list 2, the start list index i_start_p=1 corresponds to the target sub-list 5, and so on.

Step S1230: The calculation circuit 120 calculates the remainder Rm of the numeral n_sf_start divided by the period of SIB1 (160 ms) (i.e., (Rm=n_sf_start mod 160), and searches the target sub-list for the sub-list index i_start_sf corresponding to the element closest to but not smaller than the remainder Rm. Given n_sf_start=170, Rm will be 10, in which case the sub-list indices i_start_sf in sub-lists 0 to 7 of table 3 are 6, 7, 0, 0, 0, 0, 0, 0, respectively.

Figure 10:
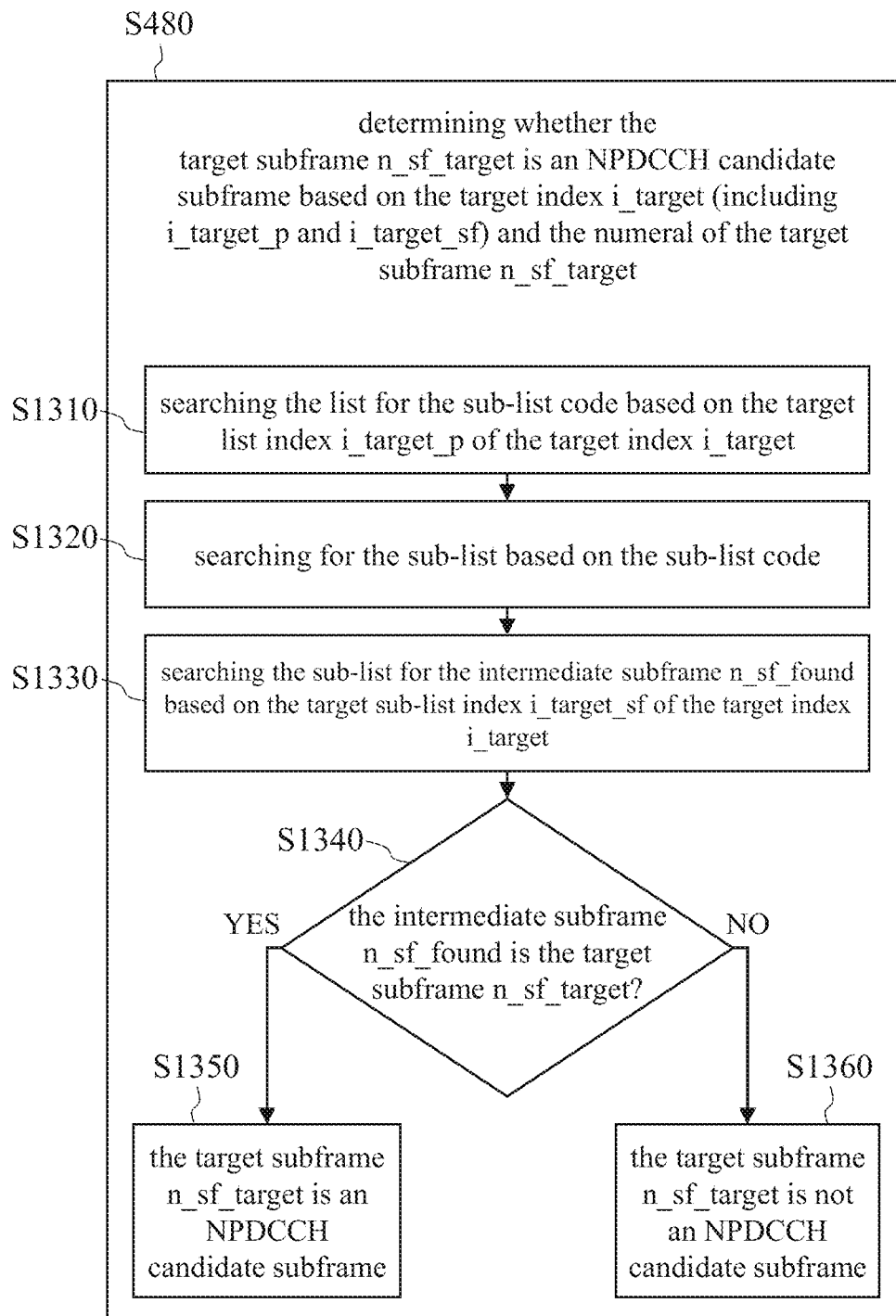
FIG. 10 illustrates the details of step S480 of FIG. 3 based on the two-tier list.

FIG. 10 shows the detail of step S480 based on the two-tier list. Step S480 can be broken down into steps S1310 to S1360, of which steps S1310 to S1330 pertain to the execution of the function index2subfn( ). The target index i_target includes the target list index i_target_p and the target sub-list index i_target_sf.

Step S1310: The calculation circuit 120 searches the list for the sub-list code based on the target list index i_target_p of the target index i_target. This step can be done by searching table 4. For example, the sub-list code is 1 when the target list index i_target_p=3.

Step S1320: The calculation circuit 120 searches table 3 for the sub-list based on the sub-list code. For example, a sub-list code of 1 corresponds to the sub-list whose total number of elements is 120.

Step S1330: The calculation circuit 120 searches the sub-list for the intermediate subframe n_sf found based on the target sub-list index i_target_sf of the target index i_target. For example, assuming that sub-list 1 is determined in the previous step, subframe 2 is then determined in this step in response to the target sub-list index i_target_sf being 1.

Steps S1340 to S1360: The calculation circuit 120 determines whether the intermediate subframe n_sf found is the target subframe n_sf_target. If so (YES branch of step S1340), the calculation circuit 120 determines that the target subframe n_sf_target is an NPDCCH candidate subframe (step S1350). If not (NO branch of step S1340), the calculation circuit 120 determines that the target subframe n_sf_target is not an NPDCCH candidate subframe (step S1360).

Figure 11:
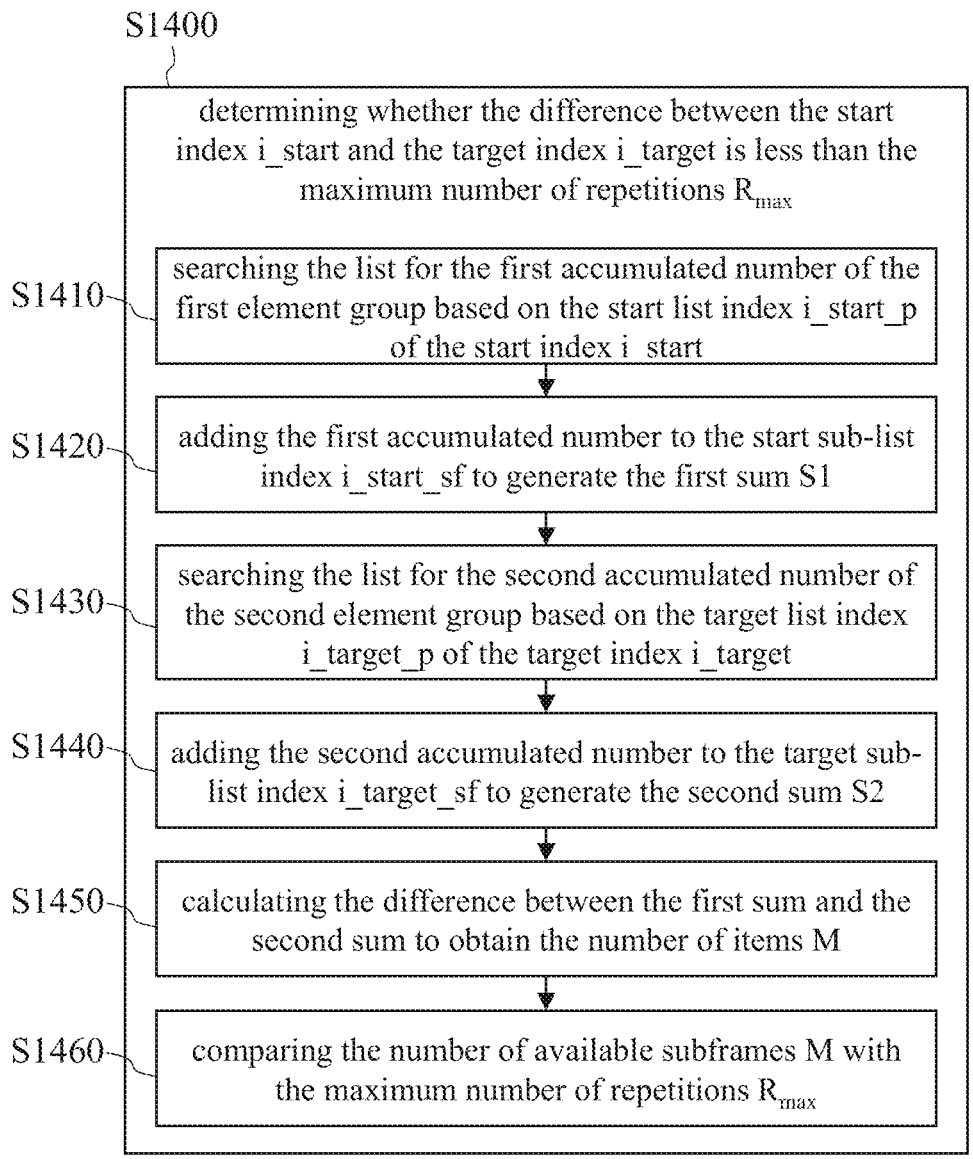
FIG. 11 illustrates the details of a part of step S470 of FIG. 3 based on the two-tier list.

FIG. 11 illustrates the details of a part of step S470 based on the two-tier list. More specifically, step S1400 "determining whether the difference between the start index i_start and the target index i_target is smaller than the maximum number of repetitions $R_{max}$" is a sub-step of step S470 and broken down into steps S1410 to S1460, of which steps S1410 to S1450 pertain to the execution of the function distance( ) based on the two-tier list.

Step S1410: The calculation circuit 120 searches the list for the first accumulated number of the first element group based on the start list index i_start_p of the start index i_start. For example (reference is made to table 4), given i_start_p=4, the first element group is {2, 416}, and the first accumulated number is 416.

Step S1420: The calculation circuit 120 adds the first accumulated number to the start sub-list index i_start_sf to generate the first sum S1. Continuing with the above example, when the first accumulated number is 416 and the start sub-list index i_start_sf=5, the first sum S1=416+5=421.

Step S1430: The calculation circuit 120 searches the list for the second accumulated number of the second element group based on the target list index i_target_p of the target index i_target. For example (reference is made to table 4), given i_target_p=5, the second element group is {5, 512}, and the second accumulated number is 512.

Step S1440: The calculation circuit 120 adds the second accumulated number to the target sub-list index i_target_sf to generate the second sum S2. Continuing with the above example, when the second accumulated number is 512 and the target sub-list index i_target_sf=17, the second sum S2=512+17=529.

Step S1450: The calculation circuit 120 calculates the difference between the first sum and the second sum to obtain the total number of items M. In other words, continuing with the above example, M=S2−S1=529−421=108. That is to say, in the examples of table 3 and table 4, there are 108 available subframes between the first index i_first ({4, 5}) and the second index i_second ({5, 17}).

Step S1460: The calculation circuit 120 compares the total number of available subframes M with the maximum number of repetitions $R_{max}$.

In summary, the method discussed above is provided to convert a one-tier list into a two-tier list, which results in a great reduction in memory usage and in turn renders the UE more competitive. As in an example where SI-x includes SI-1, SI-2, and SI-3 (i.e., there are 8 types of sub-lists, as shown in table 3), the memory size that the sub-list requires is (160+1)*8=1288 bytes (where "+1" is for the total number of elements as both the total number of elements and each subframe require one byte), and the memory size that the list requires is 40960/160*3=768 bytes (where the sub-list code requires one byte, and the accumulated number requires two). Consequently, the two-tier list requires only a total of 1288+768=2056 bytes, which is about 2.5% of the 81920 bytes that the one-tier list requires.

The above processes, functions and data can be realized using C language, but this invention is not limited thereto. For example, the sub-list of table 3 can be realized by a structure in C language, as shown in FIG. 12, where "available" is the total number of elements, the array "n_sf[160]" is the sub-list, and the indices of the array "pattern[ ]" are the sub-list codes. The list of table 4 can be realized by a structure in C language, as shown in FIG. 13, where the array "available[256]" is the list, "pattern" is the sub-list code, and "offset" is the accumulated number. FIG. 14 shows the index i (including the list index i_p and the sub-list index i_sf) and examples of the above four functions in C language. People having ordinary skill in the art can understand the meaning of the programming codes in FIG. 14, and the details are thus omitted for brevity.

After reading the above descriptions, people having ordinary skill in the art know how to establish the sub-lists based on the distributions of SI-x and SIB1 while the SI offset is present, and the details are thus omitted for brevity.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of establishing a schedule list for user equipment (UE) of Narrowband Internet of Things (NB-IoT), comprising:
   synchronizing with a cell;
   receiving at least one system information parameter from the cell, wherein the at least one system information parameter comprises at least one system information type and a Narrowband system information block type;
   establishing a plurality of sub-lists based on distributions of the at least one system information type and the Narrowband system information block type, wherein each element in the sub-lists represents an available subframe;
   assigning a sub-list code to each sub-list;
   calculating a total number of elements for each sub-list; and
   establishing a list based on the at least one system information parameter, the sub-list codes and the total numbers of elements.

2. The method of claim 1, wherein the list comprises a plurality of element groups, each element group contains the sub-list code and an accumulated number, and the accumulated number is accumulation of the total numbers of elements.

3. A scheduling method for user equipment (UE) of Narrowband Internet of Things (NB-IoT), comprising:
   synchronizing with a cell;
   receiving at least one system information parameter from the cell, wherein the at least one system information parameter comprises a maximum number of repetitions, a period and an offset of Narrowband Physical Downlink Control Channel (NPDCCH) search spaces;
   establishing a list based on the at least one system information parameter, wherein a plurality of available subframes is directly or indirectly listed in the list, and each available subframe is labeled with an index;
   calculating a numeral of a start subframe of a target NPDCCH repetitions based on a numeral of a target subframe, the period and the offset;
   using the numeral of the start subframe to search the list for a start index corresponding to the start subframe;
   searching the list for a target index corresponding to the target subframe;
   determining whether the target subframe is within an interval of the target NPDCCH repetitions based on a determination as to whether a difference between the start index and the target index is smaller than the maximum number of repetitions; and
   determining whether the target subframe is an NPDCCH candidate subframe based on the target index and the numeral of the target subframe;
   wherein the step of establishing the list based on the at least one system information parameter comprises:
      establishing a plurality of sub-lists based on distributions of at least one system information type and a Narrowband system information block type, wherein each element in the sub-lists represents one of the available subframes;
      assigning a sub-list code to each sub-list;
      calculating a total number of elements for each sub-list; and
      establishing the list based on the at least one system information parameter, the sub-list codes and the total numbers of elements.

4. The method of claim 3, wherein the list comprises a plurality of element groups, each element group contains the sub-list code and an accumulated number, and the accumulated number is accumulation of the total numbers of elements.

5. The method of claim 4, wherein the period is a first period, and the step of using the numeral of the start subframe to search the list for the start index corresponding to the start subframe comprises:
   calculating a start list index based on the numeral of the start subframe, a second period of the Narrowband system information block type, and a total number of the element groups of the list;
   searching the list for a target sub-list based on the start list index;
   calculating a remainder of a division of the numeral of the start subframe by the second period of the Narrowband system information block type; and
   searching the target sub-list for a sub-list index corresponding to the element closest to but not smaller than the remainder.

6. The method of claim 4, wherein the step of determining whether the target subframe is the NPDCCH candidate subframe based on the target index and the numeral of the target subframe comprises:
   searching the list for the sub-list code based on a target list index of the target index;
   searching for the sub-list based on the sub-list code;
   searching the sub-list for an intermediate subframe based on a target sub-list index of the target index;
   determining whether the intermediate subframe is the target subframe; and
   determining that the target subframe is the NPDCCH candidate subframe when the intermediate subframe is the target subframe.

7. The method of claim 4, wherein the step of determining whether the difference between the start index and the target index is smaller than the maximum number of repetitions comprises:
   searching the list for a first accumulated number of a first element group based on a start list index of the start index;
   adding the first accumulated number to a start sub-list index to generate a first sum;
   searching the list for a second accumulated number of a second element group based on a target list index of the target index;
   adding the second accumulated number to a target sub-list index to generate a second sum;
   calculating a difference between the first sum and the second sum to obtain a total number of available subframes; and
   comparing the total number of available subframes with the maximum number of repetitions.

8. The method of claim 3, further comprising:
   receiving the target subframe when it is determined that the target subframe is the NPDCCH candidate subframe.

9. The method of claim 3, further comprising:
   not receiving the target subframe when it is determined that the target subframe is not the NPDCCH candidate subframe.

10. A scheduling method for user equipment (UE) of Narrowband Internet of Things (NB-IoT), comprising:
    synchronizing with a cell;
    receiving at least one system information parameter from the cell, wherein the at least one system information parameter comprises a maximum number of repetitions, a period and an offset of Narrowband Physical Downlink Control Channel (NPDCCH) search spaces;
    establishing a list based on the at least one system information parameter, wherein a plurality of available subframes is directly or indirectly listed in the list, and each available subframe is labeled with an index;
    calculating a numeral of a first start subframe of a target NPDCCH repetitions based on a numeral of a target subframe, the period and the offset;
    using the numeral of the first start subframe to search the list for a start index corresponding to the first start subframe;
    searching the list for a target index corresponding to the target subframe;
    determining whether the target subframe is within an interval of the target NPDCCH repetitions based on a determination as to whether a difference between the start index and the target index is smaller than the maximum number of repetitions; and
    searching for the first start subframe of the target NPDCCH repetitions, or searching for a second start subframe of a next NPDCCH repetitions;
    wherein the next NPDCCH repetitions immediately follows the target NPDCCH repetitions;
    wherein the step of establishing the list based on the at least one system information parameter comprises:
       establishing a plurality of sub-lists based on distributions of at least one system information type and a Narrowband system information block type, wherein each element in the sub-lists represents one of the available subframes;
       assigning a sub-list code to each sub-list;
       calculating a total number of elements for each sub-list; and
       establishing the list based on the at least one system information parameter, the sub-list codes and the total numbers of elements.

11. The method of claim 10, wherein the list comprises a plurality of element groups, each element group contains the sub-list code and an accumulated number, and the accumulated number is accumulation of the total numbers of elements.

12. The method of claim 11, wherein the period is a first period, and the step of using the numeral of the first start subframe to search the list for the start index corresponding to the first start subframe comprises:
    calculating a start list index based on the numeral of the first start subframe, a second period of the Narrowband system information block type, and a total number of the element groups of the list;
    searching the list for a target sub-list based on the start list index;
    calculating a remainder of a division of the numeral of the first start subframe by the second period of the Narrowband system information block type; and
    searching the target sub-list for a sub-list index corresponding to the element closest to but not smaller than the remainder.

13. The method of claim 11, wherein the step of determining whether the difference between the start index and the target index is smaller than the maximum number of repetitions comprises:
    searching the list for a first accumulated number of a first element group based on a start list index of the start index;
    adding the first accumulated number to a start sub-list index to generate a first sum;

searching the list for a second accumulated number of a second element group based on a target list index of the target index;
adding the second accumulated number to a target sub-list index to generate a second sum;
calculating a difference between the first sum and the second sum to obtain a total number of available subframes; and
comparing the total number of available subframes with the maximum number of repetitions.

14. A user equipment operating in a Narrowband Internet of Things (NB-IoT), comprising:
a memory that stores a program code related to a function of the user equipment;
a calculation circuit coupled to the memory and configured to execute the program code stored in the memory to carry out the function of the user equipment;
a wireless signal transceiver circuit coupled to the calculation circuit;
wherein the calculation circuit receives, through the wireless signal transceiver circuit, a signal sent by a cell and synchronizes with the cell, and receives from the cell at least one system information parameter which comprises a maximum number of repetitions, a period, and an offset of Narrowband Physical Downlink Control Channel (NPDCCH) search spaces; and
wherein the calculation circuit establishes a schedule list according to the at least one system information parameter.

15. The user equipment of claim 14, wherein a plurality of available subframes is directly or indirectly listed in the schedule list, and each available subframe is labeled with an index.

16. The user equipment of claim 15, wherein the calculation circuit calculates a numeral of a start subframe of a target NPDCCH repetitions based on a numeral of a target subframe, the period, and the offset.

17. The user equipment of claim 16, wherein the calculation circuit uses the numeral of the start subframe to search the schedule list for a start index corresponding to the start subframe, and searches the schedule list for a target index corresponding to the target subframe.

18. The user equipment of claim 17, wherein the calculation circuit determines whether the target subframe is within an interval of the target NPDCCH repetitions based on the start index, the target index, and the maximum number of repetitions.

19. The user equipment of claim 18, wherein the calculation circuit determines whether the target subframe is an NPDCCH candidate subframe based on the target index and the numeral of the target subframe.

20. The user equipment of claim 14, wherein the at least one system information parameter further comprises at least one system information type and a Narrowband system information block type.

* * * * *